United States Patent
Cai et al.

(10) Patent No.: US 10,769,213 B2
(45) Date of Patent: Sep. 8, 2020

(54) DETECTION OF DOCUMENT SIMILARITY

(71) Applicant: International Business Machines Corporation, Armonk, NY (US)

(72) Inventors: Keke Cai, Beijing (CN); HongLei Guo, Beijing (CN); Zhili Guo, Beijing (CN); Feng Jin, Beijing (CN); Zhong Su, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 441 days.

(21) Appl. No.: 15/332,842

(22) Filed: Oct. 24, 2016

(65) Prior Publication Data
US 2018/0113861 A1    Apr. 26, 2018

(51) Int. Cl.
*G06F 16/00* (2019.01)
*G06F 16/93* (2019.01)
(Continued)

(52) U.S. Cl.
CPC ............ *G06F 16/93* (2019.01); *G06F 16/334* (2019.01); *G06F 16/353* (2019.01)

(58) Field of Classification Search
CPC ...... G06F 17/21; G06F 17/2785; G06F 19/00; G06F 17/3061; G06F 17/30716;
(Continued)

(56) References Cited

U.S. PATENT DOCUMENTS 5,299,125 A * 3/1994 Baker .................... G09B 21/00
                                                                434/112
7,472,121 B2   12/2008 Kothari et al.
(Continued)

FOREIGN PATENT DOCUMENTS

IN    788/MUM/2012 A * 11/2013

OTHER PUBLICATIONS

Auto-Clustering of Conversation Corpus Based on Syntactic, Semantic and Pragmatic Features, Chen et al, Proceedings of ICWMMN 2013 (Year: 2013).*
(Continued)

*Primary Examiner* — Augustine K. Obisesan
(74) *Attorney, Agent, or Firm* — Amin, Turocy & Watson, LLP

(57) ABSTRACT

Techniques for detection of document similarity are provided. The computer-implemented method can comprise identifying, by an electronic device operatively coupled to a processing unit, a first pragmatic association of a first segment in a first document portion, the first pragmatic association indicating meaning of the first segment specific to a context of the first segment in the first document portion. The computer-implemented method can also comprise generating a first intermediate document portion from the first document portion by using the first pragmatic association to replace the first segment. The computer-implemented method can further comprise determining a similarity degree between the first document portion and a second document portion by comparing the first intermediate document portion with the second document portion.

20 Claims, 3 Drawing Sheets

(51) Int. Cl.
*G06F 16/33* (2019.01)
*G06F 16/35* (2019.01)

(58) Field of Classification Search
CPC ............. G06F 17/30722; G06F 17/274; G06F 17/279; G06F 17/30011; G06F 17/30528; G06F 17/27; G06F 17/30616; G06N 5/02
See application file for complete search history.

(56) References Cited

U.S. PATENT DOCUMENTS

| | | |
|---|---|---|
| 8,868,405 B2 | 10/2014 | Kasravi et al. |
| 9,104,710 B2 | 8/2015 | Brown et al. |
| 2003/0182310 A1* | 9/2003 | Charnock ......... G06F 17/30716 |
| 2005/0108001 A1* | 5/2005 | Aarskog ............... G06F 17/271 704/10 |
| 2008/0195567 A1* | 8/2008 | Chen ..................... G06N 5/022 706/46 |
| 2010/0195909 A1* | 8/2010 | Wasson ................ G06F 17/241 382/176 |
| 2014/0207770 A1* | 7/2014 | Madsen ............ G06F 17/30699 707/730 |
| 2017/0039171 A1* | 2/2017 | Tashiro ............... G06F 17/2765 |

OTHER PUBLICATIONS

Oleshchuk, et al., "Ontology Based Semantic Similarity Comparison of Documents," Proceedings of the 14th International Workshop on Database and Expert Systems Applications (DEXA'03), 2003, 4 pages.

* cited by examiner

DETECTION OF DOCUMENT SIMILARITY

BACKGROUND

The subject disclosure relates to information processing, and more specifically, to detection of document similarity.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate detection of document similarity are described.

In one aspect, a computer-implemented method is proposed. The computer-implemented method can comprise identifying, by an electronic device operatively coupled to a processor, a first pragmatic association of a first segment in a first document portion, wherein the first pragmatic association indicates meaning of the first segment specific to a context of the first segment in the first document portion. The computer-implemented method can also comprise generating, by the electronic device, a first intermediate document portion from the first document portion by using the first pragmatic association to replace the first segment. The computer-implemented method can further comprise determining, by the electronic device, a similarity degree between the first document portion and a second document portion by comparing the first intermediate document portion with the second document portion.

In another aspect, an electronic device is proposed. The electronic device can comprise: at least one processing unit; and a memory operatively coupled to the at least one processing unit and that stores computer executable instructions that, based on execution by the at least one processing unit, facilitate performance of acts. The acts can comprise identifying a first pragmatic association of a first segment in a first document portion, wherein the first pragmatic association indicates meaning of the first segment specific to a context of the first segment in the first document portion. The acts can also comprise generating a first intermediate document portion from the first document portion by using the first pragmatic association to replace the first segment. The acts can further comprise determining a similarity degree between the first document portion and a second document portion by comparing the first intermediate document portion with the second document portion.

In yet another aspect, a computer program product for detection of document similarity is proposed. The computer program product can comprise a computer readable storage medium having program instructions embodied therewith. The program instructions can be executable by an electronic device to cause the electronic device to perform following acts. The computer program product can comprise identifying, by the electronic device, a first pragmatic association of a first segment in a first document portion, wherein the first pragmatic association indicates meaning of the first segment specific to a context of the first segment in the first document portion. The acts can also comprise generating, by the electronic device, a first intermediate document portion from the first document portion by using the first pragmatic association to replace the first segment. The acts can further comprise determining, by the electronic device, a similarity degree between the first document portion and a second document portion by comparing the first intermediate document portion with the second document portion.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Throughout the drawings, the same or similar reference numerals represent the same or similar elements.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As used herein, the terms "includes" and its variants are to be understood as open-ended terms that mean "includes, but is not limited to." The term "based on" is to be understood as "based at least in part on." The term "one embodiment" and "an embodiment" are to be understood as "at least one embodiment." The term "another embodiment" is to be understood as "at least one other embodiment." Other definitions, explicit and implicit, may be included below.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Document similarity detection can include comparison and contrast of two or more electronic documents and detection of one or more similarities of content between the documents. The document similarity detection technique can be applied in various document processing applications such as document search, classification, textual relevance detection, and the like. For example, a source document can be edited by adding, deleting, or re-writing some portions of the document to create different, new versions. Document similarity detection can help with searching similar versions or duplicate portions in the versions. In other use cases, a user may simply want to compare two or more entirely different documents or document portions, for example, from different sources or created by different parties, to detect their degree of similarity.

Figure 1:
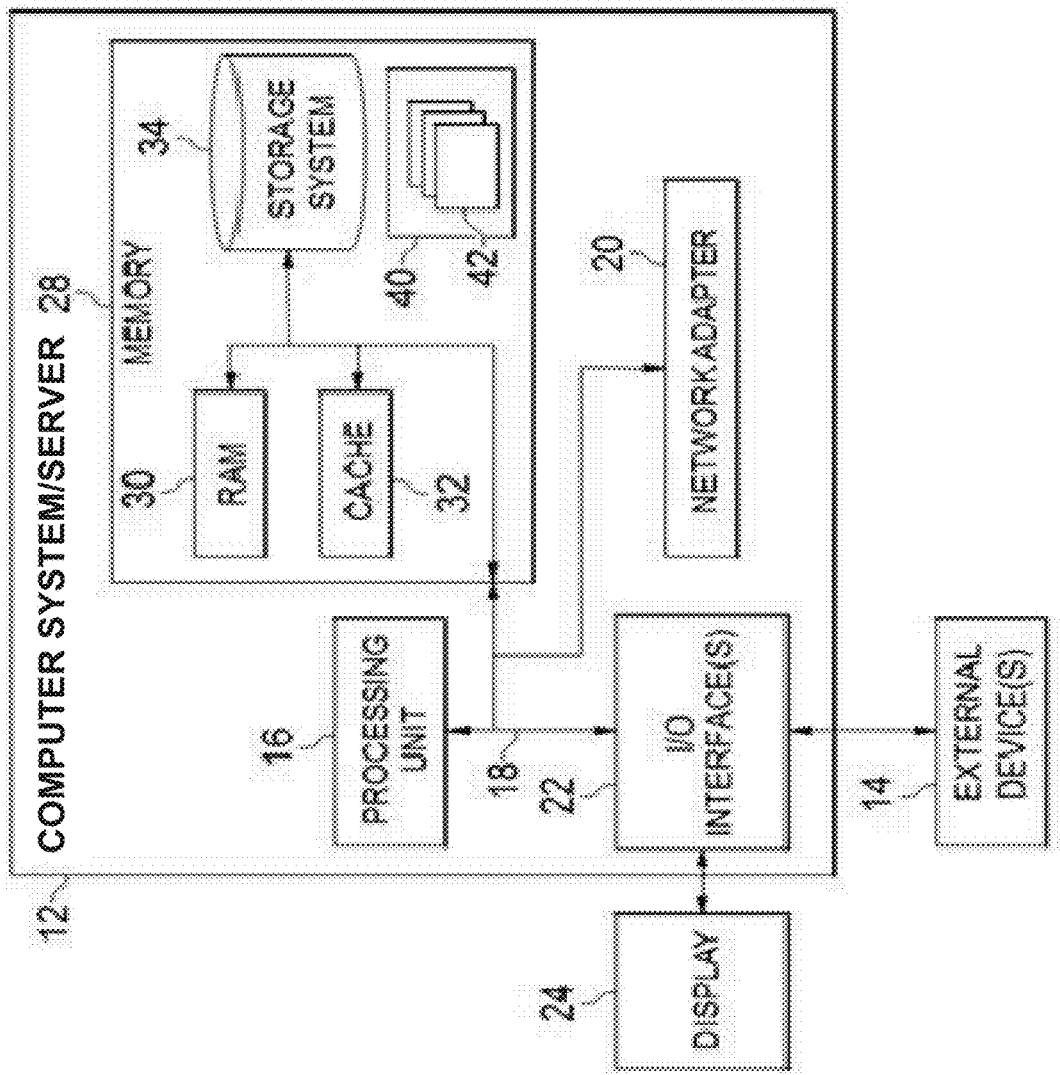
FIG. 1 illustrates a block diagram of an example, non-limiting computer system/server that can detect document similarity in accordance with one or more embodiments described herein.

FIG. 1 illustrates a block diagram of an example, non-limiting computer system/server that can detect document similarity in accordance with one or more embodiments described herein. An electronic device can be or include the computer system/server 12 in some embodiments. Computer system/server 12 is only illustrative and is not intended to suggest any limitation as to the structure of the electronic device and/or the scope of use or functionality of embodiments of the disclosure described herein.

The components of computer system/server 12 can include, but are not limited to, one or more processing units 16, a system memory 28, and a bus 18 that couples various system components including system memory 28 to processing unit 16. As used herein, the term "processing unit" should be understood to be interchangeable with the term "processor."

Bus 18 can represent one or more of any of several types of bus structures, including a memory bus or memory controller, a peripheral bus, an accelerated graphics port or a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media can be any available media that is accessible by computer system/server 12, and it can include both volatile and non-volatile media, as well as removable and non-removable media.

System memory 28 can include computer system readable media in the form of volatile memory, such as random access memory (RAM) 30 and/or cache memory 32. Computer system/server 12 can further include other removable or non-removable, volatile or non-volatile computer system storage media. By way of example only, storage system 34 can be provided for reading from and/or writing to a non-removable, non-volatile magnetic media (not shown and typically called a "hard drive"). Although not shown, a magnetic disk drive for reading from and/or writing to a removable, non-volatile magnetic disk (e.g., a "floppy disk"), and an optical disk drive for reading from and/or writing to a removable, non-volatile optical disk such as a compact disc read-only memory (CD-ROM), digital versatile disc-read only memory (DVD-ROM) or other optical media can be provided. In such instances, one or more of the disk drives can be connected to bus 18 by one or more data media interfaces. As will be further depicted and described below, memory 28 can include at least one computer program product having a set of (or, in some embodiments, at least one) computer program modules that are configured to carry out the functions of one or more of the embodiments of the disclosure.

Program/utility 40, having a set of (or, in some embodiments, at least one) program modules 42, can be stored in memory 28. By way of example, and not limitation, other aspects that can be stored in memory 28 can include an operating system, one or more application programs, other program modules, and program data. The operating system, one or more application programs, other program modules, and/or program data or some combination thereof can include an implementation of a networking environment. Program modules 42 can generally carry out the functions and/or methodologies of one or more embodiments of the disclosure as described herein.

Computer system/server 12 can also communicate with one or more external devices 14 (e.g., a keyboard, a pointing device, a display 24), one or more devices that enable a user to interact with computer system/server 12 and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN) and/or a public network (e.g., the Internet) via network adapter 20. As depicted, network adapter 20 can communicate with the other components of computer system/server 12 via bus 18. It should be understood that although not shown, other hardware and/or software components can be used in conjunction with, or included within, computer system/server 12. Examples, include, but are not limited to: microcode, device drivers, redundant processing units, external disk drive arrays, redundant array of independent disks (RAID) systems, tape drives, and/or data archival storage systems.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) can implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
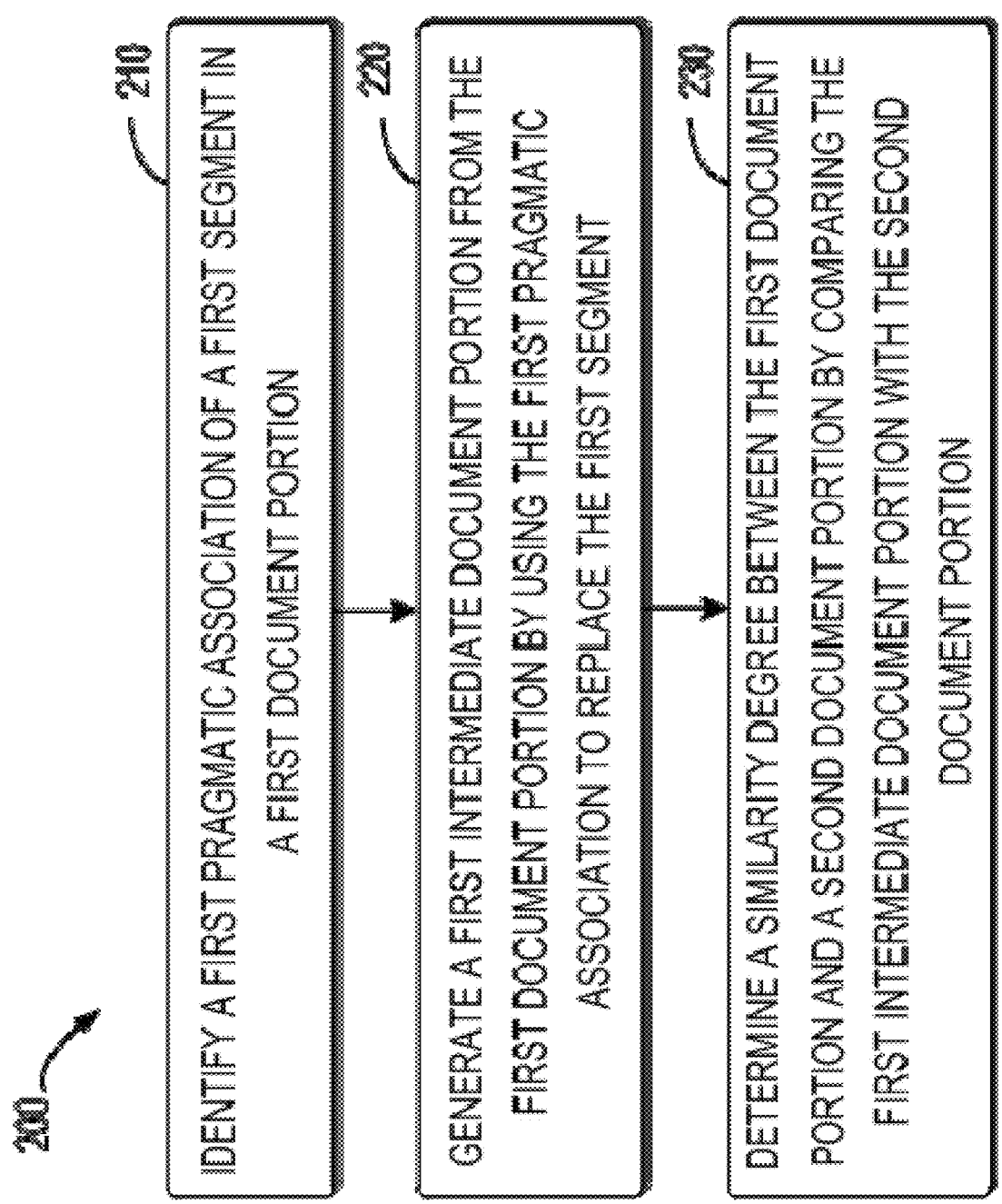
FIG. 2 illustrates a flowchart of an example, non-limiting computer-implemented method that facilitates detection of document similarity in accordance with one or more embodiments described herein.

FIG. 2 illustrates a flowchart of an example, non-limiting computer-implemented method that facilitates detection of document similarity in accordance with one or more embodiments described herein. As illustrated in FIG. 2, a similarity degree between two document portions (a first document portion and a second document portion) can be detected. The first document portion and/or the second document portion can include an entire electronic document or a portion of the electronic document (e.g., a chapter, a section, a paragraph, a clause, or a sentence). The first and second document portions can be sourced from the same electronic document or from two different electronic documents in various embodiments.

In some embodiments of FIG. 2, the first document portion can be first processed to identify one or more pragmatic clues for segments included in the first document portion. Specifically, at 210, for example, a first pragmatic association of a first segment in the first document portion can be identified. The first segment can be a fine-granularity textual portion contained in the first document portion, including, but not limited to, a word, a phrase with two or more words, or the like. The first pragmatic association can indicate meaning of the first segment specific to a context of the first segment in the first document portion. For different kinds of segments extracted from the first document portion, there can be different ways for identifying the corresponding pragmatic association, which will be described in detail below.

Figure 3:
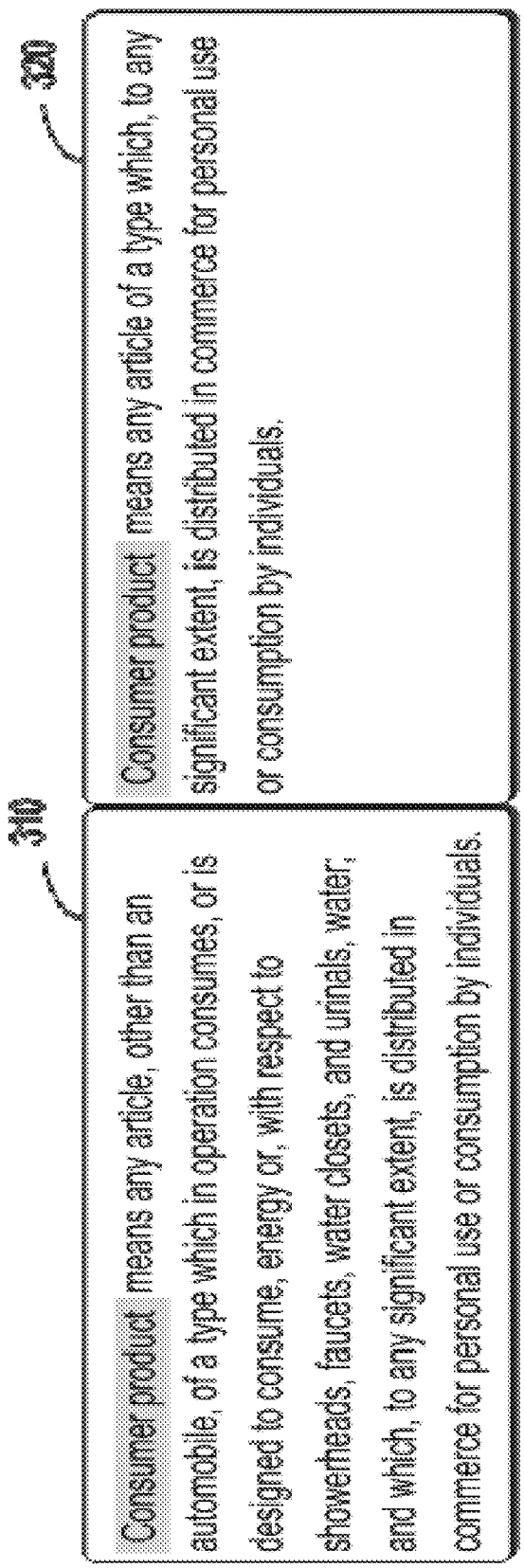
FIG. 3 illustrates a diagram of an example, non-limiting computer-implemented method facilitating comparison of definitions of the same segment of a first document portion and a second document portion in accordance with one or more embodiments described herein.

In some embodiments, the first segment can have a definition to express the specific meaning of the word within the first document portion. In various embodiments, the definition of the first segment can be contained in the first document portion or in a different portion of a document that includes the first document portion. In some embodiments, the first segment defined or identified can include one word or a phrase with two or more words. In different documents (or in different document portions), one or more of the same words can be defined using different definitions and/or different semantic extensions. For instance, FIG. 3 shows an example of a comparison of different definitions 310 and 320 of the same phrase "consumer product" in different document portions. As can be seen, the definitions 310 and 320 are different. In some embodiments, the occurrences of the words "consumer product" in different document portions can refer to or indicate different features due to their different corresponding definitions.

If no pragmatic association of a word with different definitions in different document portions is identified and used for similarity detection, the occurrences of the same word can increase the similarity degree of the different document portions, which can be undesirable. In embodiments of the present disclosure, to explore the specific meaning of the first segment, the definition of the first segment can be detected and used to determine the first pragmatic association of this segment. Therefore, the same word with different definitions can have different pragmatic associations and thus result in a decreased similarity degree, which can improve the accuracy of the document similarity detection.

Various approaches such as natural processing language (NPL) based techniques can be applied to detect whether there is a definition of the first segment included in the whole document. For example, some key words and/or special sentence structures that are related to a definition can be used to detect whether one or more sentences or paragraphs belong to or should be associated with a definition. Examples of such key words include, but are not limited to, "refer to," "mean," "is defined as," and their variants.

If the definition is detected and the corresponding word (the first segment) is found in the first document portion under consideration, then the first pragmatic association can be determined accordingly. In some examples, the first pragmatic association can be determined as the whole definition. In some other examples, to capture the semantic distribution of the definition with a low-dimensional representation, one or more semantic segment can be identified from the definition and used to determine the first pragmatic association. A semantic segment can be a key semantic feature used to represent a semantic feature of the definition. Such a semantic segment can include, but is not limited to, a content word, a topic word, an ontology concept, a domain term, a concept category, a negation word, a key number, or a condition. In some embodiments, the set of one or more detected semantic segments can be identified as the first pragmatic association.

As an example, for the definition 310 of the phrase "consumer product" in the first document portion, the following semantic segments can be extracted: Semantic segments={article, consume, energy, showerhead, faucet, water closets, urinals, water, personal use, consumption, individuals}. In some embodiments, the set of one or more semantic segments can be directly used as the pragmatic association of the phrase "consumer product." A pragmatic association for the "consumer product" can be determined in a similar way from semantic segments in the definition 320.

Alternatively, or in addition, to better capture the semantic distribution of the definition, the definition of the first segment can be quantified as a value representation based on the one or more semantic segments. The value representation for the definition can be identified as the first pragmatic association, which can also be referred as a "feature vector." In some embodiments, the value representation can be determined based on the occurrence frequency of the detected one or more semantic segments. Specifically, a frequency of a semantic segment can be detected in the definition and then a weight can be assigned to the semantic segment based on the frequency of occurrence. The weight can be selected from a range of zero to one. The assigned weight can be used to construct the value representation. In some examples, a plurality of semantic sub-segments can be extracted from the definition and assigned with respective weights so as to construct the value representation.

There can be a variety of ways for weighting a segment based on its frequency of occurrence (e.g., a word frequency-based method or a method based on term frequency-inverse document frequency (TF-IDF)). By way of example, the TF-IDF based method is described for illustration. In the TF-IDF based method, a weight assigned for a semantic segment can indicate a uniqueness level of the segment in the definition. The uniqueness level can describe how common a semantic segment is among all the semantic segments, which can be an indication of how significant it is that the semantic segment has been found in the definition in the first document. If the semantic segment has been seen in every document, then its frequent occurrences in the definition are not as meaningful as for the case when the semantic segment is found only in one document; thus a lower weight can be assigned for this segment. That is, the weight can be assigned based on both the frequency of occurrence of the semantic segment in the definition and the frequency of occurrence of the semantic segment in a corpus including a large number of documents.

It should be appreciated that the TF-IDF based method is well known in the art and various approaches can be applied to calculate the specific weight value for the semantic segment based on the frequency of occurrence of the semantic segment. In some other examples, as long as a semantic segment is detected as occurring in the definition, a weight of one can be assigned for this semantic segment, indicating its occurrence.

The value representation for the definition can have a defined number of dimensions, and some of the dimensions can correspond to the detected semantic segments while the remaining dimensions can correspond to other segments. The number of dimensions and the corresponding segments can be learned and constructed from a corpus such as a dictionary, a database of electronic documents, and/or the like. In addition to the weights assigned to the detected segments, other dimensions of the value representations can be assigned as zero since their corresponding segments have not occurred in the definition.

As an example, for the definition 310 of the phrase "consumer product," by assigning weights to the semantic segments, a value representation of the definition can be obtained as follows: Value representation1 (consumer product)={article: 0.23, consume: 0.6, energy: 0.4, showerhead: 0.5, faucet:0.5, water closets:0.5, urinals:0.5, water:0.5, personal use:0.8, consumption:0.65, individuals:0.78}. It should be understood that the weights for the detected segments are shown in the above example, and weights for other dimensions in the Value representation1 can be zero. The value representation for the definition 320 can be determined in a similar way.

In some embodiments, the first segment can include an entity. The entity can be a subject or a party involved in one or more activities described in the first document portion, such as a group, company, organization, participant person/member, and the like. In some embodiments, one or more different entity detection methods can be applied to detect the entity. In some embodiments, a pragmatic role of the entity in the first document portion can be identified as the first pragmatic association. The pragmatic role can be identified by considering the context of the first document portion. For example, if the first document portion or another portion of the first document includes an expression of "Company XXX, as a Service supplier, is responsible for . . . ," then the pragmatic association of the entity "Company XXX" can be identified as the pragmatic role of "Service supplier."

In many use cases, different entity names can be assigned with the same pragmatic role, which can mean that the pragmatic associations for the different entity names can be the same or similar in the contexts of the corresponding document portions. For example, the phrases "Company XXX" and "Company YYY" can both be assigned as "Service supplier" in two document portions and the pragmatic roles of "Company XXX" and "Company YYY" can be the same. In some other cases, the same entity can play different roles in the contexts of different document portions. By detecting the pragmatic roles as the pragmatic associations, the occurrences of different entities with the same pragmatic role in different document portions can increase the similarity degree therebetween, while the occurrences of different entities with the same pragmatic role in the same document portion can increase the frequency of the pragmatic role and thus increase the weight assigned to this entity. Therefore, the pragmatic role can be a more accurate way to represent different entities included in the document portions, instead of representation based on the names of the entities.

In some other embodiments, the first segment can include numerical information. The numerical information can include, but is not limited to, date, time, money, telephone numbers, product identification, zip codes, general digits, and so on. The numerical information can represent a special meaning under the numeric characters. The pragmatic association for the numerical information can be used to indicate the exact meaning of the numerical information in different document portions.

In various embodiments, different categories can be defined for different types of numerical information (for example, time, date, money, or general digits). The different categories can be set for a specific domain in some examples. For example, if the first document portion is related to a patent document, different categories for the date information can include the filing date, the priority date, the publication date, and the issue date. If the first document portion is related to a contract document, the date information can be categorized as the effective date, the expiration date, or the delivery date. Based on the domain information of the first document portion of interest, the corresponding categories can be obtained and a category to which the extracted numerical information belongs can be determined, for example, based on the context of the numerical information in the first document portion. In some embodiments, an indication of the determined category can be identified as the first pragmatic association of the numerical information.

It should be appreciated that although a first pragmatic association for a first segment is described above, different pragmatic associations of a plurality of different segments in the first document portion can be identified in a similar way as the first segment. For example, for different words that are defined in the first document, their respective pragmatic associations can be determined accordingly. Likewise, corresponding pragmatic associations can be determined for segments of different entities and/or various kinds of numerical information in the first document portion. It should also be appreciated that although identification of pragmatic associations for some segments is described above, many other different types of pragmatic associations can also be determined if those pragmatic associations are more suitable for semantic meanings of segments than their lexical meanings.

In order to compare the first document portion with the second document portion, the first document portion can be processed based on the identified one or more pragmatic associations. Referring back to FIG. 2, at 220, a first intermediate document portion can be generated from the first document portion by using the first pragmatic association to replace the first segment. As a result, the first segment with the specific meaning in the first document portion can be represented by the pragmatic association for the first segment instead of its lexical meaning in the generated first intermediate document portion.

In some embodiments, to replace the first segment, the first segment can be removed and the position of the first segment can be filled with the first pragmatic association in the first intermediate document portion while other segments remain the same as in the first document portion. Alternatively, or in addition, to replace the first segment, the first segment can remain in the first intermediate document portion but can be marked (or labeled) with the first pragmatic association (or an indication of the first pragmatic association). By marking or labeling, the first pragmatic association can still be available for the similarity detection. It should be appreciated that if pragmatic associations of a plurality of segments are identified, one or more of the corresponding segments can be likewise replaced by the pragmatic associations in the first intermediate document portion.

At 230, a similarity degree between the first document portion and the second document portion can be determined by comparing the first intermediate document portion with the second document portion. When the one or more segments in the first document portion is represented with the identified one or more pragmatic associations, the semantic meanings of these segments can be accurately represented in the first intermediate document portion and thus the comparison result can be improved compared with the direct comparison of the first and second document portions. A variety of methods for document comparison at the semantic level can be applied to determine the similarity degree, and the difference is that some segments in the first intermediate document portion can be replaced or marked by the corresponding pragmatic associations.

In some embodiments, to further improve the accuracy, the second document portion can be processed in a similar way as the first document portion. Specifically, a second pragmatic association of a second segment in the second document portion can be identified and a second intermediate document portion can be generated from the second document portion by using the second pragmatic association to replace the second segment.

The second pragmatic association can indicate meaning of the second segment specific to a context of the second segment in the second document portion and can be determined in a similar way as that of the first segment. For example, the second segment can be one or more words defined in the second document portion or in a second document including the second document portion, and thus the second pragmatic association can be identified based on the corresponding definition. In cases in which the second segment is an entity or the numerical information, the second pragmatic association can be likewise identified as the pragmatic role or the category of the numerical information. The detailed description of identification of the second pragmatic association is omitted here for simplicity. In some embodiments, pragmatic associations for a plurality of segments in the second document portion can be identified for use. When the one or more pragmatic associations is obtained, the second intermediate document portion can be generated accordingly.

In some embodiments, when the first and second intermediate document portions are available, the similarity degree between the first and second document portions can be determined by comparing the first and second intermediate document portions. With the segments being represented by the pragmatic association, if the pragmatic association of a segment in the first document portion is the same as or similar to the pragmatic association of another segment in the second document portion, the two segments can be regarded as the same or similar segments at the semantic and pragmatic level. That is, the pragmatic associations can be used to link the segments together as the "same" or "similar" segments even if their lexical meanings are different. On the other hand, if two segments in the two document portions are lexically the same or similar while their pragmatic associations are different, then the similarity degree of the two document portions can be decreased.

Various existing methods can be applied to measure the similarity degree at the semantic and pragmatic level. In some embodiments, the first and second intermediate document portions can be quantified as respective first and second value representations (also represented as feature vectors) for the first and second document portions based on the pragmatic associations of segments. The similarity degree can then be determined by comparing the value representations. The quantification based on the pragmatic associations can be similar as that directly based on the segments in the first and second document portions. For example, a similar method based on the frequency of occurrence as the determination of the value representation for the definition as described above can be used in determining the first and second value representations.

The determination of the first value representation for the first document portion will be described as an example. It should be appreciated that the second value representation can be obtained in a similar way. When determining the first value representation, instead of detecting a frequency of occurrences of the first segment, a frequency of occurrence of the corresponding first pragmatic association in the first intermediate document portion can be determined. The frequency of occurrence can be counted by detecting the number of the first pragmatic association occurring in the first intermediate document portion or in the segments with the marked or labeled first pragmatic association in the first intermediate document portion. The first pragmatic association can be identified with respect to the first segment and a third segment that is different from the first segment in the first document portions, but in the first intermediate document portion, only the pragmatic association may be counted for the similarity degree.

The first value representation can be determined by assigning a weight to the first pragmatic association based on its frequency of occurrence. In some embodiments in which the first pragmatic association is identified by a definition or by one or more semantic segments detected from the definition, the frequency of occurrence for this pragmatic association can be determined based on the frequency of occurrence of the definition or the respective one or more semantic segments in the first intermediate document portion. In the cases in which the first pragmatic association is identified as a value representation obtained from the definition, the weight assigned to the first pragmatic association can be determined based on both the frequency of the first pragmatic association and the value representation. In other embodiments in which the first pragmatic association is a pragmatic role of an entity or a category of the numerical information, it can be also possible to detect the frequency of occurrence of the same pragmatic role or the same category of numerical information and then assign a weight to the first pragmatic association.

Various methods based on the frequency of occurrence such as the TF-IDF method can be applied to assign the weight. If a plurality of different pragmatic associations are used to replace corresponding segments in the first intermediate document portions, respective weights can also be assigned in the first value representation. The first value representation can have a defined number of dimensions that are corresponding to different pragmatic associations (and/or semantic segments) in some examples. For those dimensions whose pragmatic associations (and/or semantic segments) are not included in the first intermediate document portions, their weights can be determined as zero.

The similarity degree can be determined by comparing the first and second value representations. Since the first and second value representations can be constructed as vectors with multiple dimensions of weights, the similarity degree can be calculated based on a cosine similarity between the two vectors (for example, a dot product of the two vectors). There can be many other methods employed for calculating the difference or similarity between the two value representations.

Although the similarity degree determination based on the value representations is described above, other methods can also be applied to compare a similarity between the two intermediate document portions in which pragmatic associations are used to replace the segments. The scope of the present disclosure is not limited in this regard. For example, the number of the same or similar pragmatic associations included in the respective document portions can be counted and used to measure the similarity degree.

The segments with corresponding pragmatic associations described above can be referred to as pragmatic segments. Except for the segments with specific pragmatic associations, the first and second document portions can contain many other general semantic segments, which can also contribute to the similarity degree. In some embodiments, these general semantic segments can be identified from the document portions and used to calculate the similarity degree.

Specifically, a third segment can be extracted from the first document portion and a fourth segment can be extracted from the second document portion. The third or fourth segment can be a semantic segment, such as a content word, a topic word, a term, and an ontology concept. Many natural language processing techniques can be applied to extract the third and fourth segments. The third and fourth segments can be used to further determine the similarity degree. In some embodiments, the first and second value representations can have respective dimensions corresponding to the third and fourth segments, and then weights can be assigned to the third and fourth segments to construct the first and second value representations. The third and fourth segments can be assigned with the corresponding weights in a similar way based on the frequency of occurrence as discussed above. In some embodiments, a plurality of general semantic segments can be extracted from the first and/or second document portions and quantified to determine the similarity degree.

By combining the pragmatic and general semantic segments, the overall first and second value representations for the first and second document portions can be constructed. The similarity degree between the two document portions can be determined by comparing the first and second value representations.

It should be appreciated that the resulting similarity degree can be used for further processing of the first and second document portions. For example, the similarity degree can be used to sort the document portions or classify the document portions. In some other embodiment, the similarity degree can be simply presented to the user.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying, by an electronic device operatively coupled to a processor, a first pragmatic association of a first segment in a first document portion of a document, wherein the first pragmatic association indicates meaning of the first segment specific to a context of the first segment in the first document portion;
    generating, by the electronic device, a first intermediate document portion from the first document portion by using the first pragmatic association to replace the first segment; and
    determining, by the electronic device, a similarity degree between the first document portion and a second document portion by comparing the first intermediate document portion with the second document portion, wherein the first segment comprises numerical information that represents a defined meaning by associated numerical characters, and the identifying the first pragmatic association comprises:
        determining, by the electronic device, a type of the document;
        identifying a defined domain related to the first document portion of the document, wherein the defined domain is identified based on the type of the document;
        determining a category to which the numerical information belongs based on the defined domain and the type of the document, wherein the category is one of a plurality of categories and the plurality of categories are defined for different types of the numerical information; and
        identifying the first pragmatic association of the numerical information as an indication of the determined category and to indicate the defined meaning of the numerical information in different portions of the document.

2. The computer-implemented method of claim 1, wherein the first segment comprises a word having a definition in a first document that comprises the first document portion, and the identifying the first pragmatic association comprises:
    detecting a definition of the word in the first document; and
    determining the first pragmatic association based on the definition.

3. The computer-implemented method of claim 2, wherein the determining the first pragmatic association based on the definition comprises:
    identifying a semantic segment from the definition; and
    determining the first pragmatic association based on the semantic segment.

4. The computer-implemented method of claim 3, wherein the determining the first pragmatic association based on the semantic segment comprises:
    detecting a frequency of occurrence of the semantic segment in the definition; and
    assigning a weight to the semantic segment based on the frequency of occurrence.

5. The computer-implemented method of claim 1, wherein the first segment comprises an entity, and the identifying the first pragmatic association comprises:
    identifying a pragmatic role of the entity in the first document portion.

6. The computer-implemented method of claim 1, further comprising:
    identifying a second pragmatic association of a second segment in the second document portion, wherein the second pragmatic association indicates meaning of the second segment specific to a context of the second segment in the second document portion; and
    generating a second intermediate document portion from the second document portion by using the second pragmatic association to replace the second segment, wherein the second segment is labeled with an indication of the second pragmatic association,
        wherein the determining the similarity degree comprises determining the similarity degree by comparing the first intermediate document portion and the second intermediate document portion.

7. The computer-implemented method of claim 1, wherein the type of the document is a patent document and the different categories for the numerical information comprises at least one of filing date, priority date, publication date or issue date of the patent document, and wherein the type of the document is a contract and the different categories for the numerical information comprises at least one of expiration date, effective date or delivery date of the contract.

8. An electronic device comprising:
    a processing unit; and
    a memory operatively coupled to the processing unit and that stores computer executable instructions that, based on execution by the processing unit, facilitate performance of acts, comprising:
    identifying a first pragmatic association of a plurality of pragmatic associations of a first segment in a first document portion, wherein the first pragmatic association indicates meaning of the first segment specific to a context of the first segment in the first document portion;
    generating a first intermediate document portion from the first document portion by using the first pragmatic association to replace the first segment;
    determining a first value representation associated with the first document portion and a second value representation associated with a second document portion, wherein the first value representation has a defined number of dimensions corresponding to different pragmatic associations;

determining a similarity degree between the first document portion and a second document portion by comparing the first intermediate document portion with the second document portion and by comparing the first value and the second value, wherein the first value and the second value are represented as vectors with multiple dimensions of weights and the similarity degree is determined based on calculating a cosine similarity between the two vectors; and replacing a segment in the first intermediate document portion with a corresponding pragmatic association, wherein the replacing is based on the determining the similarity.

9. The electronic device of claim 8, wherein the first segment includes a word having a definition in a first document that comprises the first document portion, and the identifying the first pragmatic association comprises:
  detecting the definition of the word in the first document; and
  determining the first pragmatic association based on the definition.

10. The electronic device of claim 9, wherein the determining the first pragmatic association based on the definition comprises:
  identifying a semantic segment from the definition; and
  determining the first pragmatic association based on the semantic segment.

11. The electronic device of claim 10, wherein the determining the first pragmatic association based on the semantic segment comprises:
  detecting a frequency of occurrence of the semantic segment in the definition; and
  assigning a weight to the semantic segment based on the frequency of occurrence.

12. The electronic device of claim 9, wherein the first segment includes an entity, and the identifying the first pragmatic association comprises identifying a pragmatic role of the entity in the first document portion.

13. The electronic device of claim 9, wherein the first segment comprises numerical information, and the identifying the first pragmatic association comprises:
  determining a category to which the numerical information belongs; and
  identifying the first pragmatic association of the numerical information as an indication of the determined category.

14. The electronic device of claim 9, wherein the acts further comprise:
  identifying a second pragmatic association of a second segment in the second document portion, wherein the second pragmatic association indicates meaning of the second segment specific to a context of the second segment in the second document portion; and
  generating a second intermediate document portion from the second document portion by using the second pragmatic association to replace the second segment, and
  wherein determining the similarity degree comprises determining the similarity degree by comparing the first intermediate document portion and the second intermediate document portion.

15. A computer program product for detection of document similarity, the computer program product comprising a computer readable storage medium having program instructions embodied therewith, the program instructions executable by an electronic device to cause the electronic device to:
  identify, by the electronic device, a first pragmatic association of a first segment in a first document portion, wherein the first pragmatic association indicates meaning of the first segment specific to a context of the first segment in the first document portion;
  generate, by the electronic device, a first intermediate document portion from the first document portion by using the first pragmatic association to replace the first segment;
  determine, by the electronic device, a first value representation associated with the first document portion and a second value representation associated with the second document portion; and
  determine, by the electronic device, a similarity degree between the first document portion and the second document portion by comparing the first intermediate document portion with the second document portion and by comparing the first value representation and the second value representation, wherein the first value representation and the second value representation are as vectors with multiple dimensions of weights and the similarity degree is determined based on calculating a cosine similarity between the two vectors and, wherein the first value representation is determined based on a frequency of occurrence of the first pragmatic association and wherein the second value representation is based on a frequency of occurrence of a second pragmatic association for the second document portion.

16. The computer program product of claim 15, wherein the first segment comprises a word having a definition in a first document that comprises the first document portion, and the identifying the first pragmatic association comprises:
  detecting the definition of the word in the first document; and
  determining the first pragmatic association based on the definition.

17. The computer program product of claim 16, wherein the determining the first pragmatic association based on the definition comprises:
  identifying a semantic segment from the definition;
  detecting a frequency of occurrence of the semantic segment in the definition; and
  assigning a weight to the semantic segment based on the frequency of occurrence.

18. The computer program product of claim 15, wherein the first segment comprises an entity, and the identifying the first pragmatic association comprises:
  identifying a pragmatic role of the entity in the first document portion.

19. The computer program product of claim 15, wherein the first segment comprises numerical information, and the identifying the first pragmatic association comprises:
  determining a category to which the numerical information belongs; and
  identifying the first pragmatic association of the numerical information as an indication of the determined category.

20. The computer program product of claim 15, wherein the program instructions are further executable by the electronic device to cause the electronic device to:
  identify, by the electronic device, a second pragmatic association of a second segment in the second document portion, wherein the second pragmatic association indicates meaning of the second segment specific to a context of the second segment in the second document portion;

generate, by the electronic device, a second intermediate document portion from the second document portion by using the second pragmatic association to replace the second segment; and wherein the determining the similarity degree comprises determining the similarity degree by comparing the first intermediate document portion and the second intermediate document portion.

\* \* \* \* \*